United States Patent [19]

Soodak et al.

[11] 4,209,176
[45] Jun. 24, 1980

[54] NOSE SEAL ASSEMBLY

[75] Inventors: Charles Soodak, Silver Spring; Paul Priarone, Hyattsville, both of Md.

[73] Assignee: Baxter Travenol Laboratories, Inc., Deerfield, Ill.

[21] Appl. No.: 2,722

[22] Filed: Jan. 11, 1979

[51] Int. Cl.² .................... F16J 15/34; B04B 15/00
[52] U.S. Cl. ........................... 277/95; 277/108; 277/187; 233/1 A; 233/22; 277/12
[58] Field of Search .................... 233/1 A, 21, 22; 277/4–7, 31, 12, 41–43, 81 R, 48, 49, 88, 95, 108, 177, 186, 187; 285/9 R, 331; 215/253, 352; 141/372, 172, 371, 270, 384, 370, 259, 268, 281, 368

[56] References Cited

U.S. PATENT DOCUMENTS

| | | | |
|---|---|---|---|
| 2,536,793 | 1/1951 | Andersson et al. | 233/1 A X |
| 2,605,045 | 7/1952 | Strezynski | 233/1 A |
| 3,142,401 | 7/1964 | Foss et al. | 215/352 |
| 3,695,315 | 10/1972 | Ayers | 141/368 |

FOREIGN PATENT DOCUMENTS 916121 1/1963 United Kingdom ............ 285/331

*Primary Examiner*—Robert S. Ward, Jr.
*Attorney, Agent, or Firm*—H. W. Collins; Paul Flattery; Thomas Vigil

[57] ABSTRACT

The nose seal assembly is utilized in a centrifugal chemical analysis apparatus wherein compressed air and wash water tubings are coupled through the assembly to the nose of an open ended hollow shaft for providing a seal between the nose and the assembly upon relative rotational movement therebetween. The assembly comprises a hollow bushing to which is clamped an annular web pad which is made of Nylatron NSB ® having a high pressure x velocity (PV) factor and a low coefficient of friction. The assembly further includes a heat dissipation disc to which the wear pad is clamped and an elastomeric washer which is cemented to and between the bushing and the heat dissipation disc and which is designed to provide sufficient "give" to enable the assembly to maintain a good seal when the wear surface of the wear pad is not coplanar with the plane of the nose. Also, the nose has a hemi-toroid configuration to enhance sealing with, and to reduce wear of, the wear pad.

13 Claims, 4 Drawing Figures

NOSE SEAL ASSEMBLY

BACKGROUND OF THE INVENTION

1. Field of the Invention

The present invention relates to a nose seal assembly for establishing a seal between the assembly and the nose of an open ended hollow shaft upon relative rotational movement therebetween.

2. Description of the Prior Art

In the use of centrifugal chemical analysis apparatus, it is necessary to provide a fluid coupling means between stationary parts and rotating parts. In this respect, one centrifugal chemical analysis apparatus utilizes a transfer disc having a plurality of channels arranged in a spoke like configuration therein. Each channel includes at least three wells or chambers, one for receiving reagent, one for receiving sample, and an outer well or chamber in which the sample and reagent are mixed during rotation of the transfer disc.

Coaxial with the transfer disc is an annular member containing a plurality of reaction chambers or cuvettes. Each reaction chamber has an inner opening aligned with an outer opening in the wall of a mixing chamber in the transfer disc so that when the transfer disc and annular member are rotated, mixed sample and reagent flow by centrifugal force into the reaction chamber.

Also, each time the reaction chamber passes a fixed position in the centrifugal chemical analysis apparatus, light is passed through the reaction chamber to monitor the absorbance of the mixture.

A hollow shaft which is closed at its lower end and which is open at its upper end is mounted coaxial with the transfer disc in the centrifuge of the apparatus and a cover is provided for covering the transfer disc and the annular member. The hollow shaft has a plurality of radial ports therethrough communicating with the interior of the hollow shaft near the bottom closed end thereof. Each of these ports is aligned with a port in the transfer disc communicating with the inner chamber in a line of chambers. The upper open end of the shaft is referred to as the nose of the shaft and is coupled through a stationary nose seal assembly to tubings carrying compressed air, wash water or suction.

During the operation of the centrifugal chemical analysis apparatus, after a reaction is completed, compressed air is blown through the nose seal assembly and the rotating hollow shaft through the ports and into the chamber in the transfer disc to force liquid therein into the reaction chamber where the liquid is siphoned out of the apparatus. Then wash water is injected through the seal assembly and rotating shaft into the chambers followed by application of suction to create a bubbling or scrubbing action on the wash water which is being urged outwardly by centrifugal force and inwardly by suction. Then compressed air is again blown through the seal assembly and the hollow shaft into the chambers to assist the centrifugal action in pushing the wash water out to the reaction chambers where it is siphoned out of the apparatus.

In presently available chemical analysis apparatus of this type, such as the apparatus sold under the trademark ROTOCHEM by American Instrument Company, a division of Baxter Travenol Laboratories, Inc., of Silver Spring, Maryland, a nose seal assembly is provided which provides effective sealing. This nose seal assembly includes a wear pad or washer made of graphite filled phenolic material which is cemented to a heat dissipation disc of the nose seal assembly. The other side of the heat dissipation disc is cemented to a rubber washer which is cemented to a bushing which is coupled to a manifold to which the air, wash water and suction conduits are also coupled. The assembly is utilized with a nose on the shaft which is flat except for rounded inner and outer circular corners. In use, this nose seal assembly is very noisy causing squeaking and scraping sounds and after a certain amount of wear of the wear pad, the whole seal assembly must be replaced.

As will be described in greater detail hereinafter, the nose seal assembly of the present invention provides a more effective seal between the assembly and the nose of the shaft by providing an assembly with a releasably clamped wear pad which can be replaced without replacing the whole assembly, which utilizes a nose configuration which provides good sealing, low wear, and low noise, and which includes a resilient elastomeric mounting member for the wear pad which provides good compensation or "give" for a non-coplanar mating between the plane of the top of the nose and the plane of the wear surface of the wear pad.

SUMMARY OF THE INVENTION

According to the invention there is provided a nose seal assembly for establishing a seal between the interior of said assembly and the nose of an open ended hollow shaft upon relative rotational movement therebetween, said assembly comprising a hollow bushing, an annular wear pad which is made of a material having a high pressure x velocity (PV) factor and a low coefficient of friction and which is adapted to be positioned against the nose and holding means for releasably holding said wear pad to said bushing.

Further according to the invention there is provided in combination, a nose seal assembly for establishing a seal between the nose of an open ended hollow shaft and the interior of said nose seal assembly upon relative rotational movement therebetween, said assembly comprising a hollow bushing, an annular wear pad which is made of a material having a high pressure x velocity (PV) factor and a low coefficient of friction and which is adapted to be positioned against the nose and holding means for releasably holding said wear pad to said bushing, and an open ended hollow shaft with a nose located at the upper end thereof and having a hemi-toroid configuration.

DESCRIPTION OF THE PREFERRED EMBODIMENT

Figure 1:
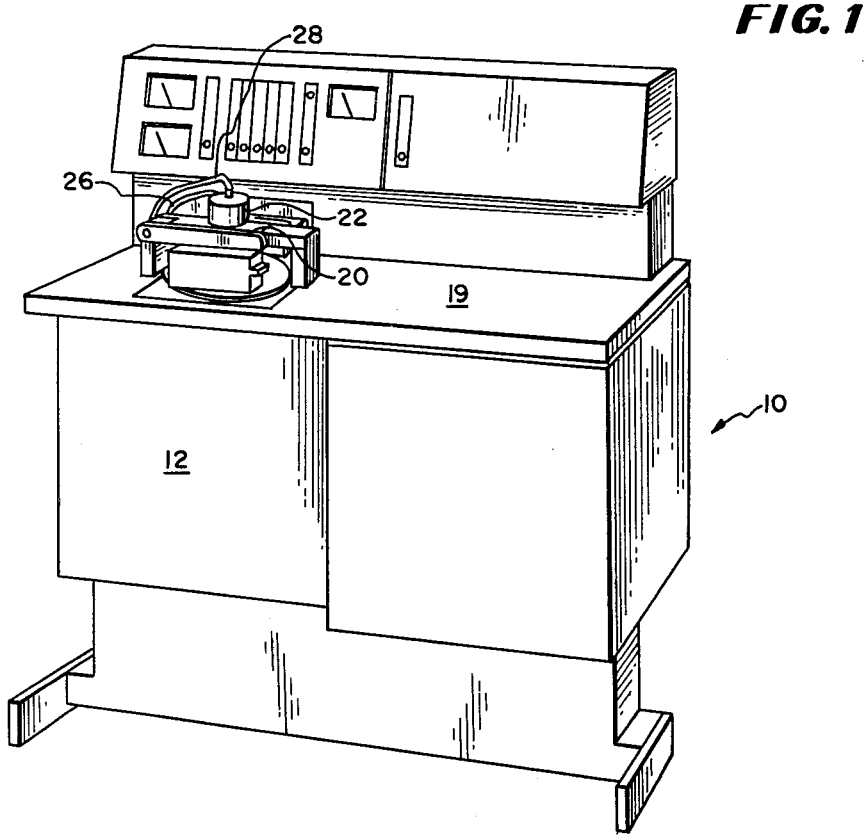
FIG. 1 is an elevational perspective view of a centrifugal chemical analysis apparatus utilizing the nose seal assembly of the present invention.

Referring to the drawings in greater detail, there is illustrated in FIG. 1 a centrifugal chemical analysis apparatus generally identified by the reference numeral 10. The apparatus 10 is of the type sold under the trademark ROTOCHEM by American Instrument Company, a division of Baxter Travenol Laboratories, Inc., of Silver Spring, Maryland, and includes a centrifuge hidden from view within a cabinet 12. Mounted on the centrifuge, and also hidden from view, is a conventional transfer disc. Above the transfer disc is a sealing cover 14 and coaxial with the transfer disc and extending from the centrifuge through the cover is a hollow shaft 16 which has an open upper end or nose 18 which, as shown in FIGS. 3 and 4, has a hemi-toroid configuration.

The shaft 16 enables compressed air, wash water and suction to be applied to the chambers in the transfer disc after an analysis has been made to clean the chambers in the transfer disc.

Figure 2:
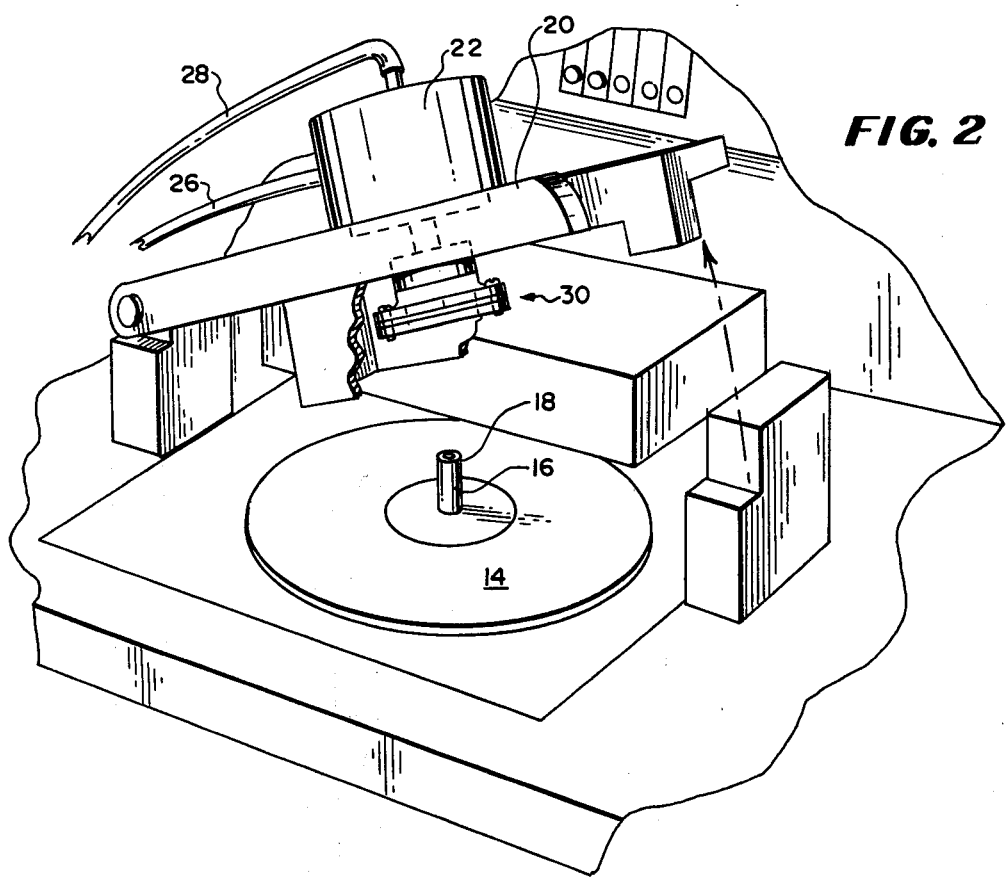
FIG. 2 is a fragmentary perspective view of a portion of the apparatus shown in FIG. 1 and shows, in an arm raised position, a pivotally mounted lever arm which mounts the nose seal assembly of the present invention.

Pivotally mounted on a table 19 of the machine 10 is a lever arm 20 which is movable between a lower position adjacent the shaft 16 and a raised position above the shaft 16. The position of the lever arm 20 in a partially raised position over the nose 18 of the shaft 16 is shown in FIG. 2. Mounted on top of the lever arm 20 is a housing 22 in which is received a generally cylindrical manifold 24, shown in FIG. 3, to which is connected tubings 26 and 28. Mounted to the manifold 24 and extending beneath the housing 22 is the nose seal assembly of the present invention which is generally identified by the reference numeral 30.

Figure 3:
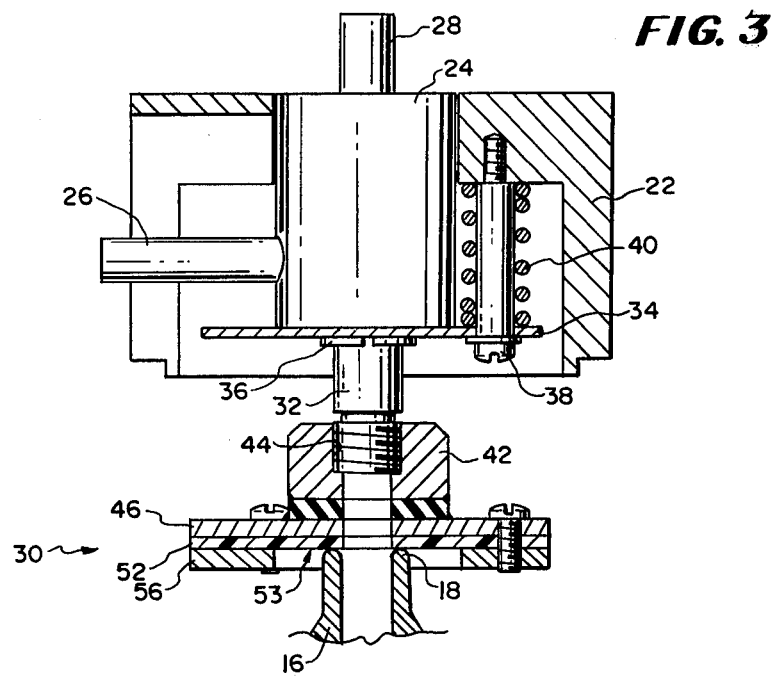
FIG. 3 is a sectional view of the nose seal assembly of the present invention juxtapposed to a nose which is situated at the upper end of a hollow shaft of the centrifugal chemical analysis apparatus and which is coupled to a manifold.
Figure 4:
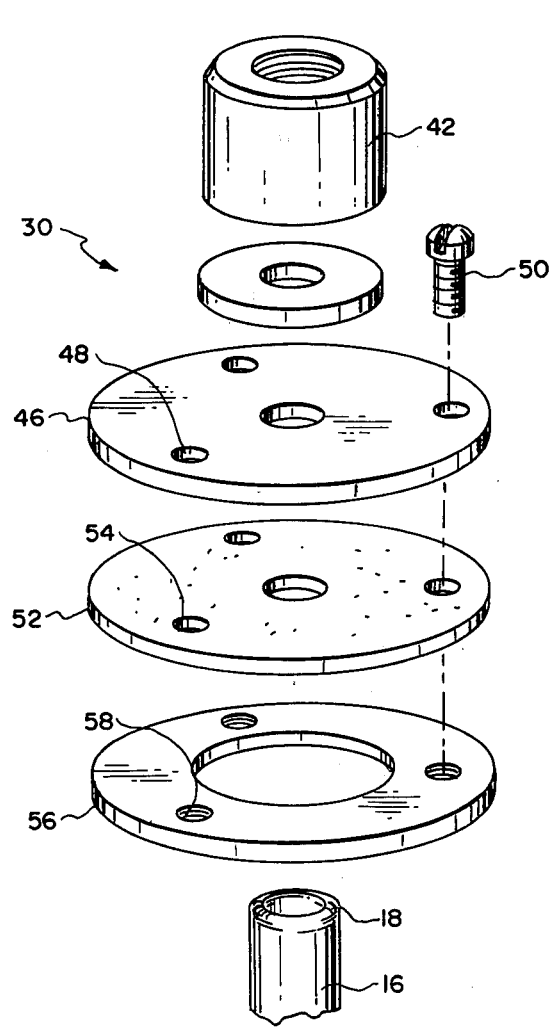
FIG. 4 is an exploded perspective view of the components of the nose seal assembly of the present invention and the nose of the hollow shaft.

As best shown in FIG. 3, the nose seal assembly 30 is threadedly coupled to a stem 32 extending from and beneath a cavity 31 in the manifold 24. Also, as best shown in FIG. 3, the manifold 24 is releasably fixed to a plate 34 by means of a snap ring 36. The plate 34 has a central aperture through which the stem 32 extends and an outer aperture through which a bolt 38 extends and is received in a bore 39 in the top wall of the cavity 31 in the housing 22. A spring 40 is positioned on the bolt 38 between the top wall of the cavity 31 in the housing 22 and the plate 34 for urging the plate against the head of the bolt 40. With this arrangement, movement of the nose seal assembly 30 and the manifold 24 against the action of the spring 40 can take place when the lever arm 20 is moved to its lower position to place the nose seal assembly 30 on the nose 18 of the shaft 16.

According to the teachings of the present invention, the nose seal assembly 30 of the present invention includes a bushing 42 having a threaded bore 43 therein in which the stem 32 is threadedly received. Cemented to the underside of the bushing is one side of an elastomeric washer 44. According to the teachings of the present invention, the washer 44 is made of silicone rubber, has a Durometer 50, Shore A and is approximately 0.094 inches thick±0.016 inches thick. A washer 44 constructed in this manner provides sufficient "give" of the assembly 30 when the assembly 30 engages the nose 18.

Further, the nose seal assembly 30 includes a heat dissipation disc 46 which is made of copper and which is cemented to the other side of the elastomeric washer 44.

As best shown in FIG. 4, the heat dissipation disc 46 has three apertures 48 in which are received fasteners 50. Positioned beneath the heat dissipation disc is a wear pad 52 that has a wear surface 53 which has three apertures 54 that are aligned with the apertures 48. Beneath the wear pad 52 is a retainer ring 56 that has three apertures 58 which are aligned with the apertures 54 and 48 and which are threaded for threadingly receiving the fasteners 50 therein for releasably clamping the wear pad 52 between the retainer ring 56 and heat dissipation disc 46.

According to the teachings of the present invention, the wear pad 52 is made of a material which is sold by The Polymer Corporation under the trademark Nylatron NSB which is a 6/6 nylon compound filled with solid lubricants and other additives. This material has a high wear factor, i.e., a high pressure x velocity (PV) factor, and a low coefficient of friction. In one realization of the nose seal assembly of the present invention, the wear pad was 0.031 inches thick.

It has been found from empirical tests that a nose seal assembly constructed in the manner described above with an elastomeric rubber washer having the thickness described above enables the nose seal assembly 30 to make an effective seal with the nose 18 of the shaft 16 even though the plane of the upper surface of the nose 18 is not coplanar with the wear surface 53 of the wear pad 52. Also, by releasably clamping the wear pad 52 to the nose seal assembly, one is able to replace the wear pad 52 without replacing the whole nose seal assembly 30.

In operation, the nose seal assembly will conform itself to the upper surface of the nose 18 after a short period of use. In this respect, the elastomeric washer 44 provides "give" and allows alignment of the wear surface 53 and the upper surface of the nose 18 even if they are not coplanar. Initially there is a high pressure and high wear as a circular line on top of the hemi-toroid nose 18 engages the wear surface 53. Then, after a short period of time, an annular groove is worn into the wear pad 52 and a greater area of contact takes place between the hemi-toroid nose 18 and the wear surface 53. At this point, pressure between the wear pad and the nose 18 is greatly reduced and wear of the wear pad is greatly reduced. This enables a longer life to be obtained with the wear pad 52 than would be attained if the nose 18 were not of a hemi-toroid configuration.

From the foregoing description it will be apparent that the nose seal assembly of the present invention has a number of advantages some of which have been described above and others of which are inherent in the invention.

Also from the foregoing description it will be apparent that obvious modifications can be made to the nose seal assembly 30 of the present invention without departing from the teachings of the invention. In this respect, other means besides fasteners 50 and the retainer ring 56 can be utilized for clamping the wear pad 52 to the nose seal assembly 30. Accordingly, the scope of the invention is only to be limited as necessitated by the accompanying claims.

We claim:

1. A nose seal assembly for establishing a seal between the interior of said assembly and the nose of an open ended hollow shaft upon relative rotational movement therebetween, said assembly comprising a hollow bushing, an annular wear pad which is made of a material having a high pressure x velocity (PV) factor and a low coefficient of friction and which is adapted to be positioned against the nose and holding means for releasably holding said wear pad to said bushing.

2. The assembly according to claim 1 wherein said holding means includes an elastomeric washer secured on one side to one side of said bushing between said bushing and said wear pad.

3. The assembly according to claim 2 wherein said elastomeric washer is made of an elastomeric material having a Durometer 50, Shore A.

4. The assembly according to claim 2 wherein said washer is made of silicone rubber.

5. The assembly according to claim 2 wherein said washer is approximately 0.094 inches thick±0.016 inches.

6. The assembly according to claim 2 wherein said holding means includes an annular, high thermal conductivity, heat dissipation disc secured to the other side of said elastomeric washer and between the washer and said wear pad.

7. The assembly according to claim 6 wherein said holding means includes means for releasably clamping said wear pad to said heat dissipation disc.

8. The assembly according to claim 6 wherein said holding means includes a retainer ring and fastening means for releasably fastening said retainer ring to said disc with said wear pad clamped therebetween.

9. The assembly according to claim 7 wherein said fastening means includes a plurality of threaded fasteners each received in an aperture in said disc through an aligned aperture in said wear pad and threadingly received in an aperture in said retainer ring.

10. The assembly according to claim 1 wherein said wear pad is made from a material which is known commercially by the trademark Nylatron NSB and which is a 6/6 nylon compounded with solid lubricants and other additives.

11. The assembly according to claim 1 being constructed and arranged for use with a nose having a hemi-toroid configuration.

12. The assembly according to claim 11 being constructed and arranged for use in a centrifugal chemical analysis apparatus.

13. In combination, a nose seal assembly for establishing a seal between the nose of an open ended hollow shaft and the interior of said nose seal assembly upon relative rotational movement therebetween, said assembly comprising a hollow bushing, an annular wear pad which is made of a material having a high pressure x velocity (PV) factor and a low coefficient of friction and which is adapted to be positioned against the nose and holding means for releasably holding said wear pad to said bushing, and an open ended hollow shaft with a nose located at the upper end thereof and having a hemi-toroid configuration.

* * * * *